March 11, 1941. J. E. RANGES 2,234,576
CASING FOR ELECTRICAL APPARATUS
Filed Sept. 27, 1939 2 Sheets-Sheet 1

INVENTOR
J. E. RANGES
BY
B. H. Jackson
ATTORNEY

March 11, 1941.   J. E. RANGES   2,234,576
CASING FOR ELECTRICAL APPARATUS
Filed Sept. 27, 1939   2 Sheets-Sheet 2

INVENTOR
J. E. RANGES
BY
ATTORNEY

Patented Mar. 11, 1941

2,234,576

UNITED STATES PATENT OFFICE 2,234,576

CASING FOR ELECTRICAL APPARATUS

John E. Ranges, East Rutherford, N. J., assignor to Bell Telephone Laboratories, Incorporated, New York, N. Y., a corporation of New York Application September 27, 1939, Serial No. 296,821

6 Claims. (Cl. 178—46)

This invention relates to cases or containers for housing electrical apparatus and, more particularly, to the manner of mounting the apparatus in such cases.

In telephone transmission systems the advantage of inserting inductance coils in the transmission lines to neutralize or offset the inherent capacity of the lines is well known, such coils being generally known as loading coils. It is also well known that where telephone transmission lines are closely associated with power lines or other telephone or telegraph lines it is necessary to greatly attenuate, if not completely eliminate, any extraneous currents induced in one telephone line by currents in the other lines. To accomplish the latter result, induction coils or filters of various forms are inserted in the telephone lines to attenuate extraneous currents and at the same time to pass freely the desired telephone currents. The induction coils used for this purpose are quite generally known as choke or retardation coils.

The coils for the purposes outlined are housed in containers which must protect the coils from mechanical injury or moisture when used with either aerial or underground lines. These containers vary in size according to the number of coils to be housed and the number of coils varies according to the number of transmission lines which are to be loaded or protected.

Heretofore various types of cases and methods of housing the coils have been proposed. Most of such cases have been filled with some kind of filling compound after the coils are housed, to keep the coils in position and to exclude moisture.

For various reasons a number of transmission lines may be grouped in a cable having a lead or other impervious sheath and instead of using a filling compound such sheaths are filled with dry air or other gas under pressures approximating 10 pounds per square inch. Apparatus cases housing apparatus associated with such lines are also adapted to withstand the internal pressure of the gas in the cables so that the cable may enter the case and hence the cable requires no plug or other means to retain the gas therein when it is terminated in such a container. Under these circumstances certain economies and simplifications of apparatus cases can be made which are not possible with cases containing filling compound.

An object of the present invention is an apparatus case which is of simple structure and inexpensive to manufacture.

Another object of the invention is an apparatus case in which individual coils are readily accessible for adjustment or replacement.

To accomplish these objects the invention in one form comprises a rectangular, welded steel casing having a cover which may be welded or otherwise detachably fastened thereto. On the cover and depending therefrom into the casing is a mounting panel which may be a sheet-steel plate. On opposite edges of this mounting panel are notched brackets. The ends of spindles, over which the coils to be housed have been slipped, fit into the notches in the brackets and are held therein by perforated strips which fit tightly over the ends of the spindles.

Other objects and features of the invention will be apparent from the following description of one embodiment and the attached drawings, in which.

Figure 1:
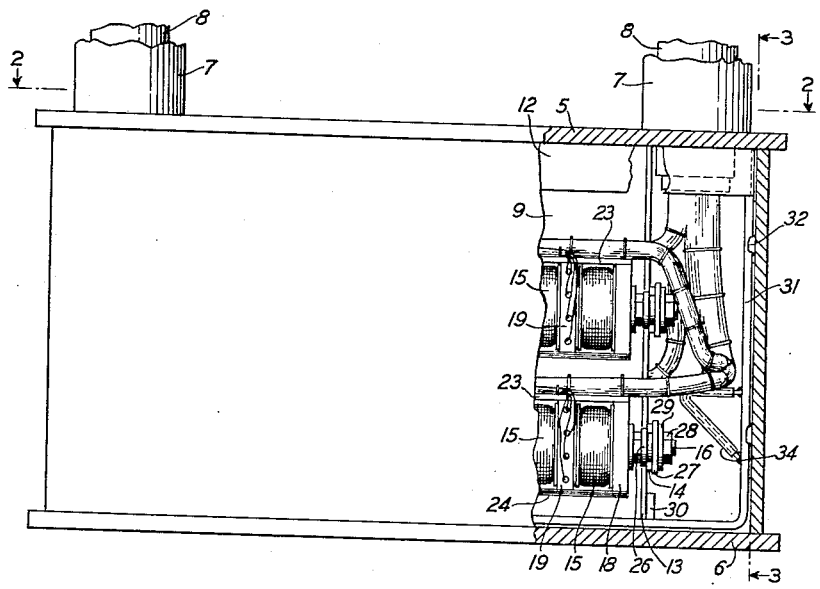
Fig. 1 is a side view of a case with one side cover partly cut away.
Figure 2:
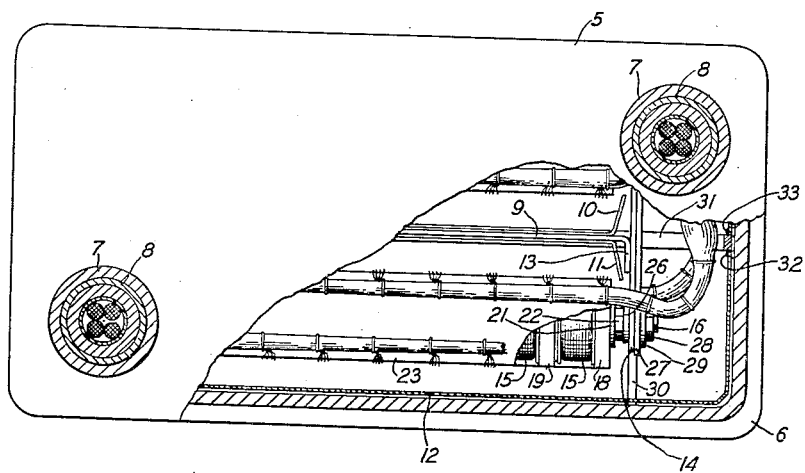
Fig. 2 is a view along line 2—2 of Fig. 1 with the top cover partly cut away.
Figure 3:
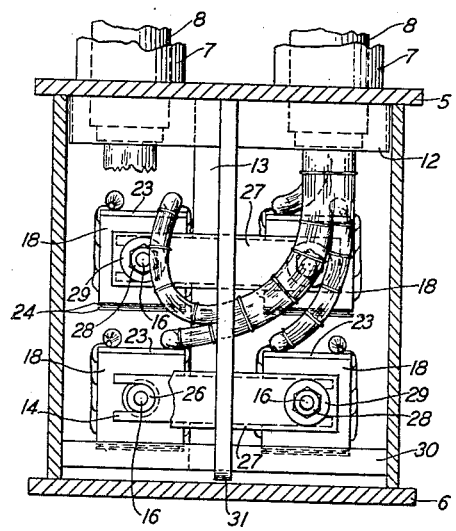
Fig. 3 is a view along line 3—3 of Fig. 1.

Referring to the drawings, the case is a rectangular steel container to which top 5 and bottom 6 are welded, forming gas-tight seals. The top 5 is provided with nipples 7 through which stub cables 8 pass to the inside of the case. Each stub cable is soldered to the inside of the nipple by pouring molten solder into the space therebetween, whereby a gas-tight seal is made between the stub cable and the case.

Welded to the top or cover 5 and perpendicular thereto is a mounting panel 9. This panel is substantially parallel to the longer sides of the case and extends nearly to the bottom of the case. Attached to each side of the mounting panel, as by rivets, are sheets of insulation 10 and 11 which may be of hemp wood pulp and which substantially cover the mounting panel. Also welded to the top and perpendicular thereto is a guard plate 12. This plate extends downwardly only a short distance and fits snugly into the case along all four sides. The function of this guard plate is to prevent any metal getting into the case during the welding process.

The mounting panel 9 is bent at both ends as shown to form surfaces 13 to which notched brackets 14 are welded. It is to be understood that whereas only the right-hand end of the structure as viewed in the figures, is shown in detail, the left-hand end is constructed in the same manner.

The coils 15 are mounted in groups on steel spindles 16. Tubes of insulating material 17 around the spindles serve to insulate the coils from the spindles. Wooden blocks form end-pieces 18 and coil spacers 19. These wooden blocks also serve as terminal blocks to facilitate connecting the coils to the cable conductors. Insulating washers 20 and steel washers 20' are inserted between the coils and the wooden blocks. Steel washers 20' constitute magnetic shields between the coils and there is one such washer between each two coils on a spindle. More than one steel washer between coils may be used if desired. The coils are clamped together on the spindles by means of a screw-thread on the spindles and nuts 22. Washers 21 are placed between nuts 22 and end-pieces 18. Joining the end-pieces 18 and spacers 19 on top are plates of insulation 23, while on the bottom are two plates of insulation 24 and an interleaving steel plate 25.

Figure 4:
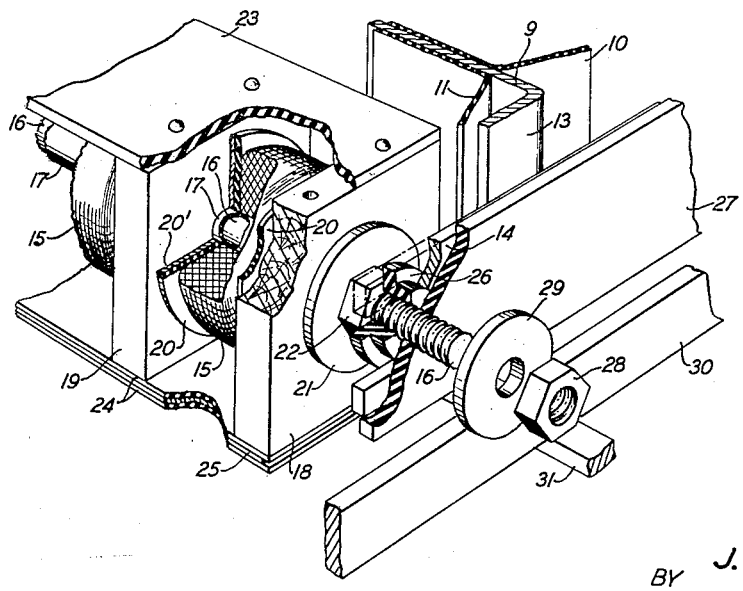
Fig. 4 is an enlarged perspective view, partly in section, of a spindle and coil assembly.

The ends of the spindles are mounted in the notches of notched brackets 14 mounted on both ends of panel 9 as shown in detail in Fig. 4 for the right-hand end. An insulating bushing 26 is inserted in the notch between the spindle and bracket, and an insulating plate 27 is slipped over the ends of the spindles against the brackets. The spindles are, therefore, completely insulated from the brackets. The insulating plates 27, perforated to slip over the ends of the spindles, hold the spindles in position in the notched brackets. Nuts 28 provide additional holding means. Washers 29 are placed between nuts 28 and insulating plates 27.

At each end of the lower edge of mounting panel 9 and welded to surfaces 13 are straight steel strips 30 perpendicular to the panel and parallel to the bottom which abut the longer sides of the container when the coil assembly is placed in the container. These strips 30 prevent swaying of the lower part of the assembly.

Welded to the top 5 and the guard plate 12 is a U-shaped steel strip 31 which passes down the sides and under the assembly. This strip passes between projections 32, 33 on the sides of the case when the cover and coil assembly are being lowered into the case, to assist in properly locating the assembly.

Steel angle brackets 34 which are covered with insulating material are welded to strip 31. These brackets support conductor groups which are fanned out from the cable. These conductor groups are further supported by upper insulating plate 23 of the coil groups as the conductors are fanned out to the individual coils.

In many cases involving the use of the electrical apparatus case herein described the cables are of the so-called gas-filled type, that is, they contain air or other inert gas at a pressure of approximately 10 pounds per square inch. These cases are particularly adapted to use with such cables since they are gas-tight, as pointed out above. Hence, no plugs or other means are required in the ends of the cables where they enter the cases, and where, as in the present case, two cables are involved, the gas has a comparatively free path through the case from one cable to the other. Under such circumstances no filling compounds, such as bitumen, insulating oils, etc., need be used.

Note is made of the fact that the cover 5 is considered "detachable" by those skilled in the art although welded to the case. This is because the welding material may be easily removed by the application of heat without injury to the cover, the case or the contained apparatus. After removal of the welding material the cover with the attached assembly may be removed from the case.

It is to be understood that whereas the case described herein comprises a substantially central mounting plate with coil groups mounted on both sides thereof, circumstances may require a mounting panel near one side of the case with the coil groups mounted on only one side of the panel. Likewise, only two coil groups are shown on each side of the panel, but with greater depth of case more groups may be mounted on each side. It is also to be understood that all the spaces along a spindle which might be occupied by a coil need not be so occupied but that where certain coils are omitted, satisfactory spacers may be used. The invention, therefore, is to be limited only by the scope of the appended claims.

What is claimed is:

1. An electrical apparatus case comprising a metallic housing, a detachable cover therefor, a panel suspended from said cover, brackets attached to and spaced along opposite ends of said panel, spindles supported between said brackets and electrical apparatus supported on said spindles.

2. An electrical apparatus case comprising a metallic housing, a detachable cover therefor, a panel suspended from said cover, brackets provided with notches in the ends thereof, said brackets being attached to and spaced along the ends of said panel, spindles extending between said brackets and mounted in said notches for support by said brackets, electrical apparatus supported by said spindles and perforated means for maintaining said spindles in said notches.

3. An electrical apparatus case comprising a metallic housing, a detachable cover therefor, a panel suspended from said cover, brackets attached to and spaced along opposite ends of said panel, spindles supported between said brackets substantially parallel to both said cover and said panel, and electrical apparatus supported on said spindles.

4. An electrical apparatus case comprising a metallic housing, a detachable cover therefor, a panel suspended from said cover, brackets attached to and spaced along opposite ends of said panel, spindles supported between said brackets, and electrical apparatus supported on said spindles, said housing containing a gas under a pressure greater than atmospheric pressure.

5. In combination, an air-tight casing, cables leading into said casing and hermetically sealed thereto, a mounting panel welded to the cover of the casing, notched brackets on opposite edges of said panel, spindles mounted in said brackets and insulated therefrom, toroidal coils mounted on said spindles, said mounting panel, notched brackets, spindles and coils forming a coil assembly, a narrow metal strip spaced from the ends and passing under the bottom of said assembly, and angle brackets mounted on said narrow strip for supporting the conductors leading from said cables to said coils.

6. The combination according to claim 5 in which projections on the side of the case form guides for said narrow strip to position said assembly in said case.

JOHN E. RANGES.